(12) United States Patent
DiSimone

(10) Patent No.: US 7,361,012 B2
(45) Date of Patent: Apr. 22, 2008

(54) MULTIPLE-LEVEL STACK MOLD APPARATUS

(75) Inventor: John DiSimone, Woodbridge (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 213 days.

(21) Appl. No.: 10/966,296

(22) Filed: Oct. 15, 2004

(65) Prior Publication Data

US 2006/0082032 A1 Apr. 20, 2006

(51) Int. Cl.
*B29C 45/00* (2006.01)

(52) U.S. Cl. .................. 425/572; 425/234; 425/588; 425/338; 264/328.8

(58) Field of Classification Search ............... 425/234, 425/572, 588, 338; 264/328.8
See application file for complete search history.

(56) References Cited

U.S. PATENT DOCUMENTS

| | | | |
|---|---|---|---|
| 3,659,997 A | 5/1972 | Rees | |
| 5,185,119 A | 2/1993 | Schad et al. | |
| 5,370,523 A | 12/1994 | Kushnir | |
| 5,707,666 A | 1/1998 | DiSimone et al. | |
| 5,846,472 A | 12/1998 | Rozema et al. | |
| 5,968,562 A * | 10/1999 | Schad et al. | 425/572 |
| 6,575,731 B1 | 6/2003 | Olaru et al. | |
| 6,852,265 B2 * | 2/2005 | Olaru et al. | 264/328.8 |

FOREIGN PATENT DOCUMENTS

CA 2022060 12/1991

* cited by examiner

*Primary Examiner*—Yogendra N. Gupta
*Assistant Examiner*—Maria Veronica Ewald

(57) ABSTRACT

The present invention is a multiple-level stack mold for balancing the injection of molten plastic from an injection molding machine to a plurality of cavities, at least one cavity on each level of the multiple-level stack mold, for producing plastic parts facing in the same direction. Cavity plates are assembled in the multiple-level stack mold all facing in a first direction, and either core plates or plates having inserts thereon are assembled in the multiple-level stack mold all facing in a second direction. The clamping mechanism simultaneously moves the cavity plates and the core plates into engagement. Molten plastic is then evenly and simultaneously injected and distributed through a plurality of channels and passages, such that the flow of molten plastic is balanced throughout the system. Thereafter, the cavity plates and the core plates are simultaneously separated, thereby allowing removal of the resulting plastic parts, which are all facing in the same direction.

11 Claims, 5 Drawing Sheets

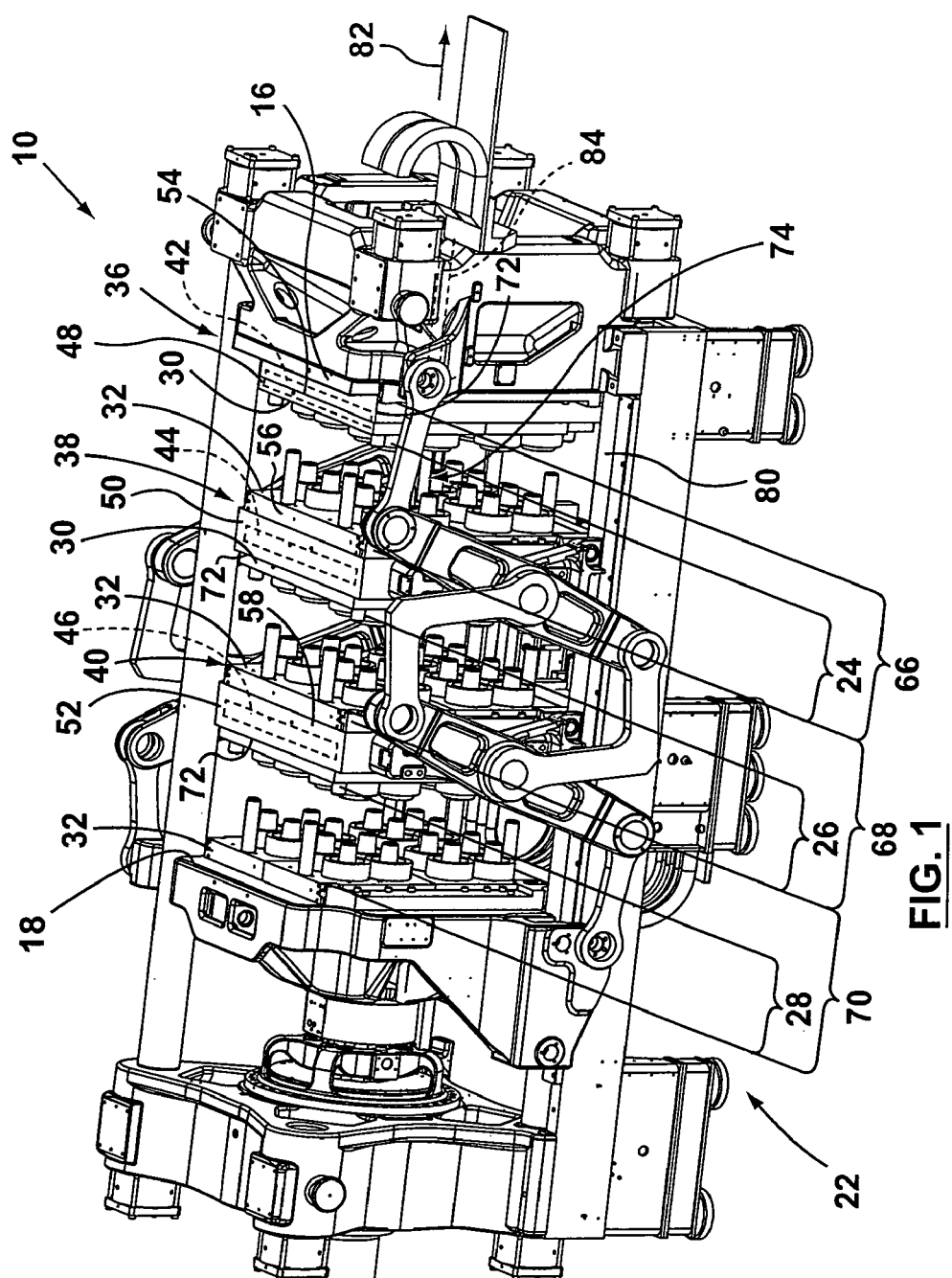
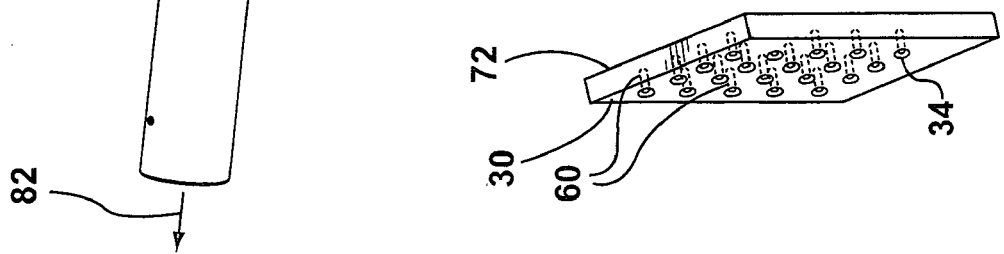

MULTIPLE-LEVEL STACK MOLD APPARATUS

BACKGROUND OF THE INVENTION

1. Technical Field of the Invention

The present invention relates to injection molding and more particularly, to a balanced, multiple-level stack mold having molds, hot runners, a sprue bar, split sprue bars, transition bushings, and melt channels, wherein each mold includes a plurality of first plates having at least one cavity therein and a plurality of second plates having at least one core or core inserts thereon, wherein the first plates simultaneously mate with the second plates, thereby defining a plurality of cavities, and wherein the first plates are all orientated in the same direction and hence the second plates are all orientated in the same direction, thereby producing plastic parts orientated in the same direction.

2. Description of the Related Art

Stack molds are generally known in the prior art and used in conjunction with injection molding machines to produce plastic parts. Most injection molding machines have a clamping mechanism that is hydraulically, mechanically, and/or electrically actuated to open and close the stack mold.

Most stack molds have two or three-levels, wherein each level contains two complementary plates that are brought together when the clamping mechanism of the injection molding machine is moved to the closed position. The complementary plates usually include a plate having at least one cavity therein and a plate having at least one core or core inserts thereon. When these plates mate or are brought together, the cavities and cores cooperate to define at least one cavity in the shape of the plastic parts that are to be molded. Molten plastic is injected into the cavity, and the mold is then moved into the open position to eject the resulting plastic part formed in the cavity.

The obvious benefit of using two-, three-, or four-level stack mold arrangements is an increase in production over a single-level mold arrangement. However, a disadvantage with the two-, three, and four-level stack molds is that the cavity plates and, hence, the core plates or plates having the core inserts thereon, are not all facing in the same direction, thereby requiring complex handling systems for removing and processing the resulting plastic parts. Because the plastic parts are not facing in the same direction upon ejection from the injection molding machine, the handling system that removes and processes the plastic parts needs to perform complex maneuvers. This results in inefficiency and increased cost.

U.S. Pat. No. 5,185,119 to Schad et al. discloses a stack mold for use with an injection molding machine. Each of the mold stations has a cavity plate, and all of the cavity plates are facing in the same direction and, hence, all of the core plates are facing in the same direction. Schad et al. overcame some of the disadvantages in the prior art and simplified the handling system required to process the plastic parts being ejected from the injection molding machine. However, the disadvantage in Schad et al. is that it is a tandem machine which opens, closes, and fills the molds sequentially as opposed to simultaneously. Because Schad et al. uses a sequential process in a tandem machine, output is not maximized.

The present invention is directed to overcoming one or more of the problems and disadvantages set forth above, and providing a balanced, multiple-level stack mold configured such that the cavity plates are facing in the same directions and the cavities in the molds are simultaneously filled with molten plastic, thereby producing plastic parts that are facing in the same direction, which reduces the complexity of the downstream handling system.

SUMMARY OF THE INVENTION

The present invention is a multiple-level stack mold having cavity plates facing in the same direction, thereby producing plastic parts that will be facing in the same direction upon ejection, thereby reducing the complexity of the downstream handling system required for processing the plastic parts. The present invention also includes a multiple-level stack mold that simultaneously opens and closes, and simultaneously receives molten plastic in the cavities of the molds in each level.

The present invention also includes a multiple-level stack mold that is balanced, such that the flow paths for the molten plastic have substantially the same lengths, diameters, and turns to travel.

The present invention is a multiple-level stack mold that incorporates molds, hot runner systems, a sprue bar, split sprue bars, transition bushings, and melt channels to distribute equal amounts of molten plastic to the cavities in the molds in each level.

It is important to note that the present invention is not intended to be limited to an apparatus which must satisfy one or more of any stated feature or advantage of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the following appended claims.

BRIEF DESCRIPTION OF THE DRAWINGS

These and other features and advantages of the present invention will be better understood by reading the following detailed description, taken together with the drawings wherein:

FIG. 1 is a perspective view of a multiple-level stack mold according to the present invention;

FIG. 1A is a perspective view of a cavity plate in the multiple-level stack mold shown in FIG. 1;

DETAILED DESCRIPTION

Figure 2:
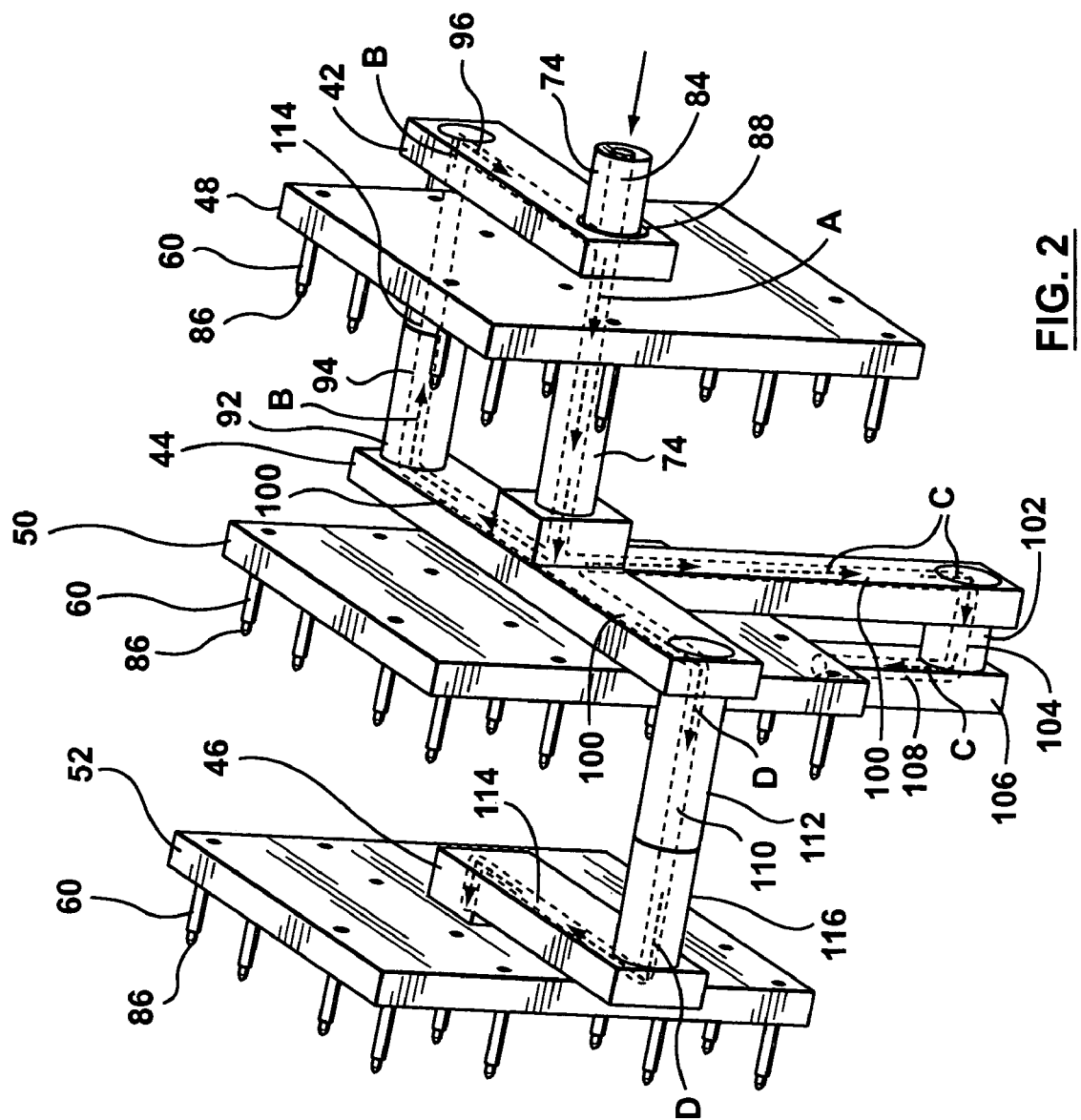
FIG. 2 is a perspective view of manifolds, a sprue bar, split sprue bars, transition bushings, melt channels, and nozzles of the multiple-level stack mold in a closed or clamped position illustrating the flow paths of the molten plastic according to the present invention.

The present invention will now be described in several embodiments. Referring now to the drawings and initially to FIG. 1, a multiple-level stack mold constructed in accordance with the present invention is designated as numeral 10. Although the following detailed description will describe the invention in relation to a three-level stack mold, the present invention is not limited to a three-level stack mold and can be practiced with any number or levels of stack molds.

The multiple-level stack mold 10 is operatively mounted in a clamping mechanism 22 of a standard injection molding machine (not shown). The clamping mechanism 22 includes a stationary platen 16 at one end and a moving platen 18 at an opposite end.

A plurality of molds 24, 26, 28 are operatively mounted between the stationary platen 16 and the moving platen 18 and movably mounted along a longitudinal axis 82. A plurality of hot runner systems 36, 38, 40 are adjacent the plurality of molds 24, 26, 28, respectively. The hot runner systems 36, 38, 40 include, but are not limited to, manifolds 42, 44, 46, manifold plates 48, 50, 52, backing plates 54, 56, 58, and nozzles 60, respectively. The hot runner systems 36, 38, 40 keep the molten plastic hot during delivery from a sprue bar 74 to the plurality of molds 24, 26, 28.

In the preferred embodiment, three of the molds 24, 26, 28 are operatively arranged and moveable along the longitudinal axis 82 in the clamping mechanism 22 as a three-level stack mold 10. From the stationary platen 16 moving toward the moving platen 18, the three-level stack mold 10 is arranged as follows. A first hot runner 36 is operatively mounted to the stationary platen 16. A first side 72 of a cavity plate 30 of a first mold 24 is operatively mounted to the first hot runner 36. A core plate or plate having core inserts thereon (hereinafter collectively referred to as a "core plate 32") is moved into and out of engagement with the cavity plate 30 by the movement of the clamping mechanism 22. In operation, the cavity plate 30 and the complementary core plate 32 cooperate and are brought into engagement, thereby defining cavities 34 for receiving molten plastic to produce plastic parts. The nozzles 60 of the first hot runner 36 are in fluid connection with the cavities 34. The first mold 24 and the first hot runner 36 define a first level 66 in the three-level stack mold 10 which is evident when the clamping mechanism 22 is in a closed position.

From the first level 66 moving toward the moving platen 18, a second hot runner 38 is operatively mounted to the core plate 32 of the first mold 24. A first side 72 of a cavity plate 30 of a second mold 26 is operatively mounted to the second hot runner 38. A core plate 32 for the second mold 26 is operatively mounted to a third hot runner 40 and is moved into and out of engagement with the cavity plate 30 of the second mold 26 by the movement of the clamping mechanism 22. In operation, the cavity plate 30 and the complementary core plate 32 cooperate and are brought into engagement, thereby defining cavities 34 for receiving molten plastic to produce plastic parts. The nozzles 60 of the second hot runner 38 are in fluid connection with the cavities 34. The second mold 26 and the second hot runner 38 define a second level 68 in the three-level stack mold 10 which is evident when the clamping mechanism 22 is in the closed position.

From the second level 68 moving toward the moving platen 18, a third hot runner 40 is operatively mounted to the core plate 32 of the second mold 26. A first side 72 of a cavity plate 30 of a third mold 28 is operatively mounted to the third hot runner 40. A core plate 32 for the third mold 28 is operatively mounted to the moving platen 18 and is moved into and out of engagement with the cavity plate 30 of the third mold 28 by the movement of the clamping mechanism 22. In operation, the cavity plate 30 and the complementary core plate 32 cooperate and are brought into engagement, thereby defining cavities 34 for receiving molten plastic to produce plastic parts. The nozzles 60 of the third hot runner 40 are in fluid connection with the cavities 34. The third mold 28 and the third hot runner 40 define a third level 70 in the three-level stack mold 10 which is evident when the clamping mechanism 22 is in the closed position.

In operation, the clamping mechanism 22 moves the moving platen 18 toward the stationary platen 16 along the longitudinal axis 82 such that all of the core plates 32 simultaneously engage or are brought together simultaneously with the cavity plates 30 in all three-levels 66, 68, 70. The sprue bar 74 is also brought into engagement with an injection nozzle (not shown) of the injection molding machine at that time. After molten plastic is injected into the cavities 34 of the molds 24, 26, 28 via the injection molding machine and hot runner systems 36, 38, 40, which is explained in greater detail hereinafter, the clamping mechanism 22 moves the moving platen 18 away from the stationary platen 16 along the longitudinal axis 82 such that all of the core plates 32 simultaneously disengage or are separated simultaneously from the cavity plates 30 in all three-levels 66, 68, 70 exposing the resulting plastic part. When the clamping mechanism 22 is opened, the sprue bar 74 is also separated from the injection nozzle of the injection molding machine at that time.

The sprue bar 74 is operatively connected to and in fluid connection with the second hot runner system 38. Thus, when the moving platen 18 is moved along the longitudinal axis 82 toward the stationary platen 16, the sprue bar 74 is moved into engagement with the nozzle of the injection molding machine. When the moving platen 18 is moved along the longitudinal axis 82 away from the stationary platen 16, the sprue bar 74 will be moved away from and out of engagement with the nozzle of the injection molding machine. The sprue bar 74 has a flow channel 84 which may be plugged with an anti-drool bushing/ball check combo, or core stem to prevent molten plastic from flowing from the nozzle of the injection molding machine to the sprue bar 74 when the sprue bar 74 is separated from the nozzle of the injection molding machine.

Turning now to FIG. 2, the flow path of molten plastic in the three-level stack mold 10 according to the preferred embodiment of the present invention is shown as dotted lines and arrows. FIG. 2 depicts the preferred embodiment in a closed or clamped position. For clarity, only a limited number of components is shown to illustrate the flow path of molten plastic from the nozzle of the injection molding machine to the cavities 34 of the molds 24, 26 28. It is noted that the lengths and diameters of the flow path leading to each of the manifolds 42, 44, 46 and then within each of the manifolds 42, 44, 46 leading to each of the cavities 34 are respectively and substantially equal so that the flow of molten plastic is balanced throughout the three-level stack mold 10 and each of the cavities 34 is simultaneously supplied with a substantially equal amount of molten plastic. This flow path ensures a balanced system.

Molten plastic is delivered from the nozzle of the injection molding machine to the sprue bar 74 when the three-level stack mold 10 is placed in the closed or clamped position, FIG. 2, by the clamping mechanism 22. The flow channel 84 of the sprue bar 74 directs the molten plastic to the second manifold 44 along a first flow path A. A cutout 88 in the first manifold 42, first manifold plate 48, and first backing plate 54 allows the sprue bar 74 to be in fluid connection with the second manifold 44 without going through the first manifold 42 first.

The second manifold 44 has internal melt channels 100 that are "T" shaped and direct molten plastic from the flow channel 84 of the sprue bar 74 to all three cavity plates 30 in substantially equal amounts. The second manifold 44 directs molten plastic along a second flow path B, a third flow path C, and a fourth flow path D. The molten plastic traveling along the second flow path B is directed through an internal melt passage 100 of the second manifold 44 to an internal melt passage 94 of split sprue bars 92, 114 which leads to an internal melt passage 96 of the first manifold 42. The internal melt passage 96 of the first manifold 42 then splits into melt channel layouts or flow paths that balance the flow of molten plastic to 2-, 4-, 6-, 8-, 12-, 16-, 18-, 24-, 32-, 48-, etc. drop systems as is commonly known in the art. These flow paths balance the flow of the molten plastic to the cavities 34 and are used to facilitate symmetrical manifolds. For example, the flow path for supplying a 16-drop system having four drops in four clusters may be in an "X" or "H" configuration to balance and equally distribute the flow of molten plastic.

The second manifold 44 also directs molten plastic along a third flow path C. The molten plastic traveling along the third flow path C is directed through internal melt passage 100 of the second manifold 44 to an internal melt passage 104 of a transition bushing 102, which leads to an internal passage 108 of a second part 106 of the second manifold 44. The internal passage 108 of the second manifold 44 then splits into melt channel layouts or flow paths that balance the flow of molten plastic to 2-, 4-, 6-, 8-, 12-, 16-, 18-, 24-, 32-, 48-, etc. drop systems as is commonly known in the art. These flow paths balance the flow of the molten plastic to the cavities 34 and are used to facilitate symmetrical manifolds. For example, the flow path for supplying a 16-drop system having four drops in four clusters may be in an "X" or "H" configuration to balance and equally distribute the flow of molten plastic.

The second manifold 44 also directs molten plastic along a fourth flow path D. The molten plastic traveling along the fourth flow path D is directed through an internal melt passage 100 of the second manifold 44 to an internal melt passage 110 of split sprue bars 112, 116 which leads to an internal melt passage 114 of the third manifold 46. The internal melt passage 114 of the third manifold 46 then splits into melt channel layouts or flow paths that balance the flow of molten plastic to 2-, 4-, 6-, 8-, 12-, 16-, 18-, 24-, 32-, 48-, etc. drop systems as is commonly known in the art. These flow paths balance the flow of the molten plastic to the cavities 34 and are used to facilitate symmetrical manifolds. For example, the flow path for supplying a 16-drop system having four drops in four clusters may be in an "X" or "H" configuration to balance and equally distribute the flow of molten plastic.

FIG. 2 shows all of the nozzles 60 of the hot runner systems 34, 36, 38 facing in the same direction. Tips 86 of the nozzles 60 are in fluid connection with the cavities 34 of the cavity plates 30 on all three-levels 66, 68, 70, such that the cavity plates 30 are also facing in the same direction, thereby producing plastic parts facing in the same direction. As previously described, producing plastic parts that face in the same direction upon ejection reduces the complexity of the downstream handling systems.

Figure 3:
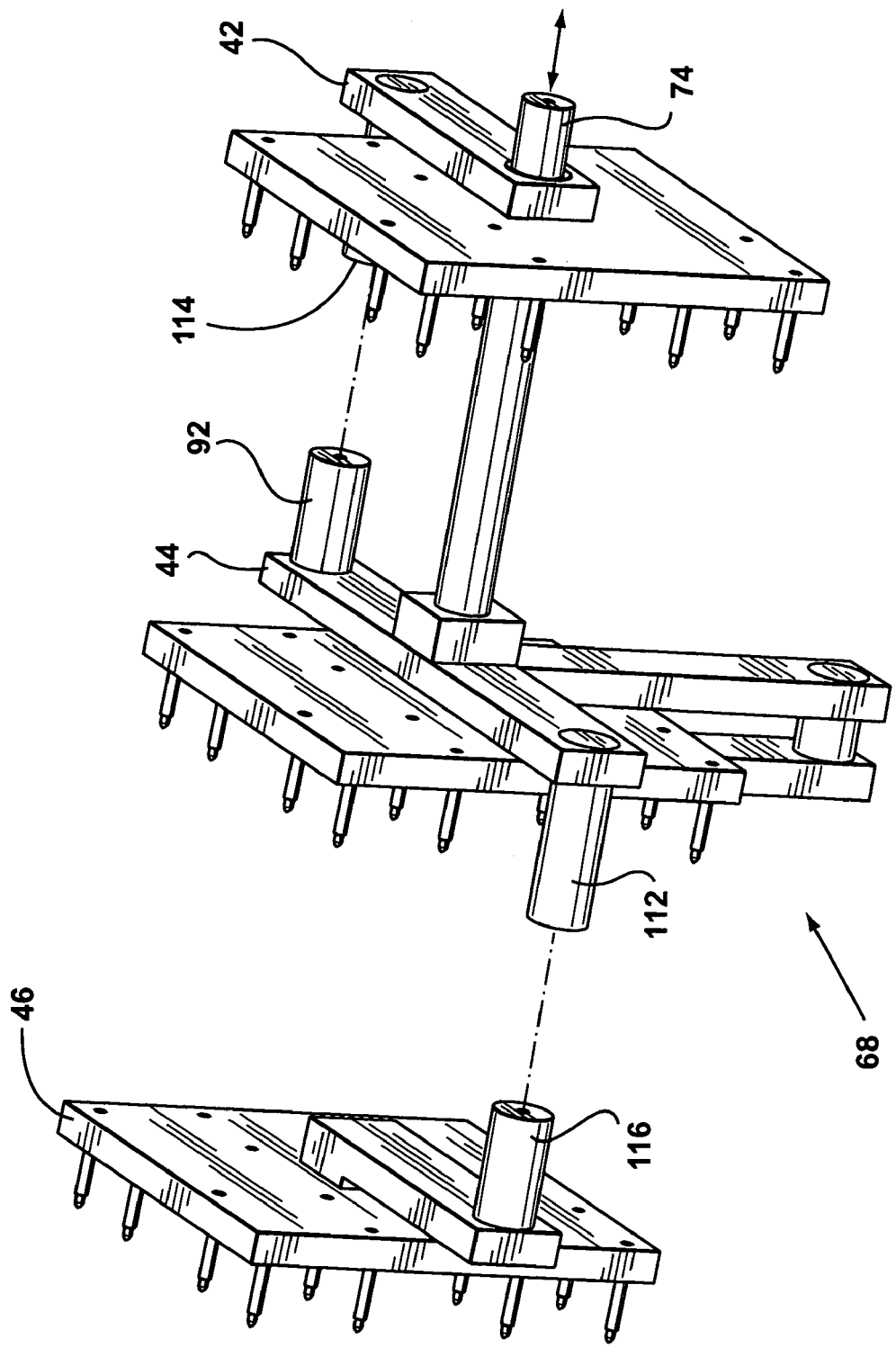
FIG. 3 is a perspective view of the components shown in FIG. 2 but in an open or unclamped position according to the present invention.

FIG. 3 shows the preferred embodiment of the present invention as shown in FIG. 2 but in an open or unclamped position. The flow of molten plastic from the nozzle of the injection molding machine to the flow channel 84 of the sprue bar 74 is stopped when the three-level stack mold 10 is placed in the open or unclamped position, FIG. 3, by the clamping mechanism 22. In moving the three-level stack mold 10 from the clamped or closed position shown in FIG. 2 to the unclamped or open position shown in FIG. 3 via the clamping mechanism 22, the sprue bar 74 is moved away from the nozzle of the injection molding machine by the movement of the second-level 68 away from the injection molding machine via the clamping mechanism 22. The sprue bar 74 is operatively connected to the second hot runner system 38 of the second-level 68 and, thus, moves with the second-level 68 of the three-level stack mold 10. The movement of the sprue bar 74 away from the nozzle of the injection molding machine stops the flow of molten plastic to the sprue bar 74. Specifically, the flow of molten plastic is stopped by devices known in the art. For example, the flow channel 84 of the sprue bar 74 may be plugged with an anti-drool bushing/ball check combo, or core stem. In addition to the sprue bar 74 moving away from the nozzle of the injection molding machine, the split sprue bars 92, 114 and 112, 116 are separated disconnecting flow paths B, D between the first manifold 42 and the second manifold 44, and between the second manifold 44 and the third manifold 46, respectively. The flow of molten plastic along flow paths B, D is stopped by devices known in the art. For example, the split sprue bars 92, 114 and 112, 116 have valve stems or bushing/ball check combo (not shown) for plugging their internal passages to stop the flow of molten plastic when disconnection takes place.

In summary, the three-level stack mold 10 is assembled in the clamping mechanism 22 of the injection molding machine such that all of the cavity plates 30 are facing in the same direction and all of the core plates 32 are facing in the same direction. The clamping mechanism 22 simultaneously moves the cavity plates 30 and the core plates 32 into engagement, or into a closed or clamped position. The nozzle of the injection molding machine distributes molten plastic to the flow channel 84 of the sprue bar 74. The molten plastic is then distributed as previously explained with respect to FIG. 2, which is a balanced distribution system. Thereafter, the cavity plates 30 and the core plates 32 are simultaneously separated, thereby allowing removal of the resulting plastic parts, which are all facing in the same direction. The present invention is a balanced system that simultaneously opens and closes the molds, simultaneously injects molten plastic into the cavities 34, and produces plastic parts facing in the same direction.

Figure 4:
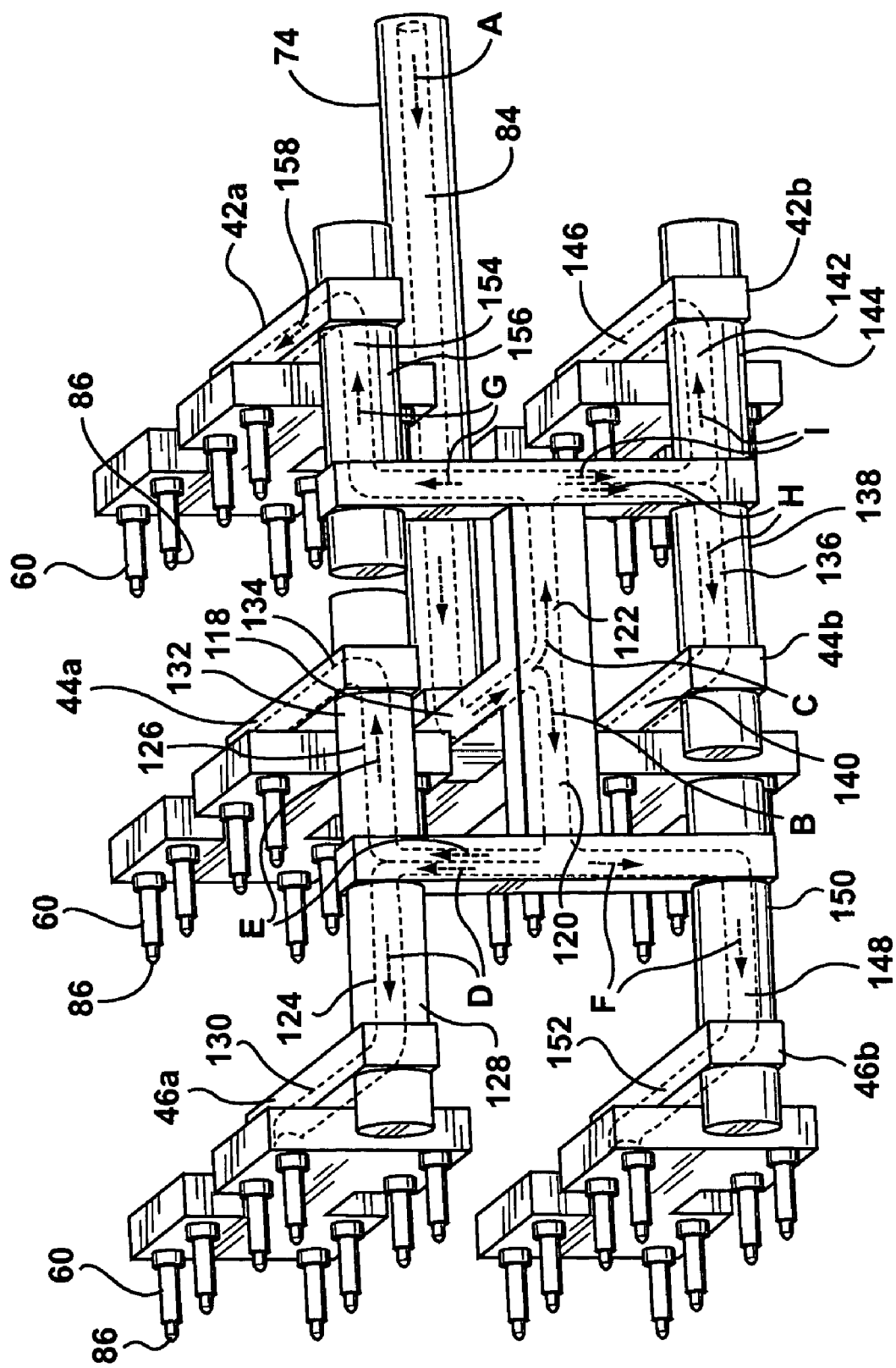
FIG. 4 is a perspective view of manifolds, a sprue bar, split sprue bars, transition bushings, melt channels, and nozzles of the multiple-level stack mold in a closed or clamped position illustrating the flow paths of the molten plastic according to an alternative embodiment of the present invention.

FIG. 4 shows the flow path of the molten plastic as dotted lines and arrows in the three-level stack mold 10 according to an alternative embodiment of the present invention. FIG. 4 depicts the alternative embodiment in a closed or clamped position. For clarity, only a limited number of components is shown to illustrate the flow path of the molten plastic from the nozzle of the injection molding machine to the cavities 34 of the molds 24, 26 28. In the alternative embodiment, there are two manifolds 42a, 42b, 44a, 44b, 46a, 46b at each level 66, 68, 70 of the three-level stack mold 10, respectively. It is noted that the lengths and diameters of the flow paths leading to each of the manifolds 42a, 42b, 44a, 44b, 46a, 46b and then within each of the manifolds 42a, 42b, 44a, 44b, 46a, 46b leading to each of the cavities 34 are substantially equal so that the flow of molten plastic is balanced throughout the three-level stack mold 10 and each of the cavities 34 is simultaneously supplied with a substantial equal amount of molten plastic. This flow path ensures a balanced system.

Molten plastic is delivered from the nozzle of the injection molding machine to the sprue bar 74 when the three-level stack mold 10 is placed in the closed or clamped position, FIG. 4, by the clamping mechanism 22. The spate bar 74 is in fluid connected with a transition manifold 118 on the second level 68. The flow channel 84 of the spate bar 74 directs the molten plastic to the transition manifold 118 along a first flow path A. The transition manifold 118 has internal melt channels 120, 122 for splitting the molten plastic into flow paths B, C. The molten plastic moving along flow path B is split into three flow paths D, E, F and the molten plastic moving along flow path D is spit into three flow paths G, H, I. Each of the flow paths D, E, F, G, H, I are independent from each other, the same lengths and diameters, and are balanced for distributing substantially equal amounts of molten plastic to every nozzle 60 and, hence, each of the cavities 34.

The molten plastic traveling along flow path D is directed through an internal melt passage 124 of a split sprue bar 128 to an internal passage 130 of the third manifold 46a, which then splits into melt channel layouts or flow paths that balance the flow of molten plastic to 2-, 4-, 6-, 8-, 12-, 16-, 18-, 24-, 32-, 48-, etc. drop systems as is commonly known in the art. These flow paths balance the flow of the molten plastic to the cavities 34 and are used to facilitate symmetrical manifolds. For example, the flow path for supplying a 16-drop system having four drops in four clusters may be in an "X" or "H" configuration to balance and equally distribute the flow of molten plastic.

The molten plastic traveling along flow path E is directed through an internal melt passage 126 of a sprue bar 132 to an internal passage 134 of the second manifold 44a, which then splits into melt channel layouts or flow paths that balance the flow of molten plastic to 2-, 4-, 6-, 8-, 12-, 16-, 18-, 24-, 32-, 48-, etc. drop systems as is commonly known in the art. These flow paths balance the flow of the molten plastic to the cavities 34 and are used to facilitate symmetrical manifolds. For example, the flow path for supplying a 16-drop system having four drops in four clusters may be in an "X" or "H" configuration to balance and equally distribute the flow of molten plastic.

The molten plastic traveling along flow paths H is directed through an internal melt passage 136 of a sprue bar 138 to an internal passage 140 of the second manifold 44b, which then splits into melt channel layouts or flow paths that balance the flow of molten plastic to 2-, 4-, 6-, 8-, 12-, 16-, 18-, 24-, 32-, 48-, etc. drop systems as is commonly known in the art. These flow paths balance the flow of the molten plastic to the cavities 34 and are used to facilitate symmetrical manifolds. For example, the flow path for supplying a 16-drop system having four drops in four clusters may be in an "X" or "H" configuration to balance and equally distribute the flow of molten plastic.

The molten plastic traveling along flow paths I is directed through an internal melt passage 142 of a split sprue bar 144 to an internal passage 146 of the first manifold 42b, which then splits into melt channel layouts or flow paths that balance the flow of molten plastic to 2-, 4-, 6-, 8-, 12-, 16-, 18-, 24-, 32-, 48-, etc. drop systems as is commonly known in the art. These flow paths balance the flow of the molten plastic to the cavities 34 and are used to facilitate symmetrical manifolds. For example, the flow path for supplying a 16-drop system having four drops in four clusters may be in an "X" or "H" configuration to balance and equally distribute the flow of molten plastic.

The molten plastic traveling along flow F is directed through an internal melt passage 148 of a split sprue bar 150 to an internal passage 152 of the third manifold 46b, which then splits into melt channel layouts or flow paths that balance the flow of molten plastic to 2-, 4-, 6-, 8-, 12-, 16-, 18-, 24-, 32-, 48-, etc. drop systems as is commonly known in the art. These flow paths balance the flow of the molten plastic to the cavities 34 and are used to facilitate symmetrical manifolds. For example, the flow path for supplying a 16-drop system having four drops in four clusters may be in an "X" or "H" configuration to balance and equally distribute the flow of molten plastic.

The molten plastic traveling along flow paths G is directed through an internal melt passage 154 of a split sprue bar 156 to an internal passage 158 of the first manifold 42a, which then splits into melt channel layouts or flow paths that balance the flow of molten plastic to 2-, 4-, 6-, 8-, 12-, 16-, 18-, 24-, 32-, 48-, etc. drop systems as is commonly known in the art. These flow paths balance the flow of the molten plastic to the cavities 34 and are used to facilitate symmetrical manifolds. For example, the flow path for supplying a 16-drop system having four drops in four clusters may be in an "X" or "H" configuration to balance and equally distribute the flow of molten plastic.

FIG. 4 shows all of the nozzles 60 of the hot runner systems 36, 38, 40 facing in the same direction. The tips 86 of the nozzles 60 are in fluid connection with the cavities 34 of the cavity plates 30 on all three-levels 66, 68, 70, such that the cavity plates 30 are also facing in the same direction, thereby producing plastic parts facing in the same direction. As previously described, producing plastic parts that face in the same direction upon ejection reduces the complexity of the downstream handling systems.

Figure 5:
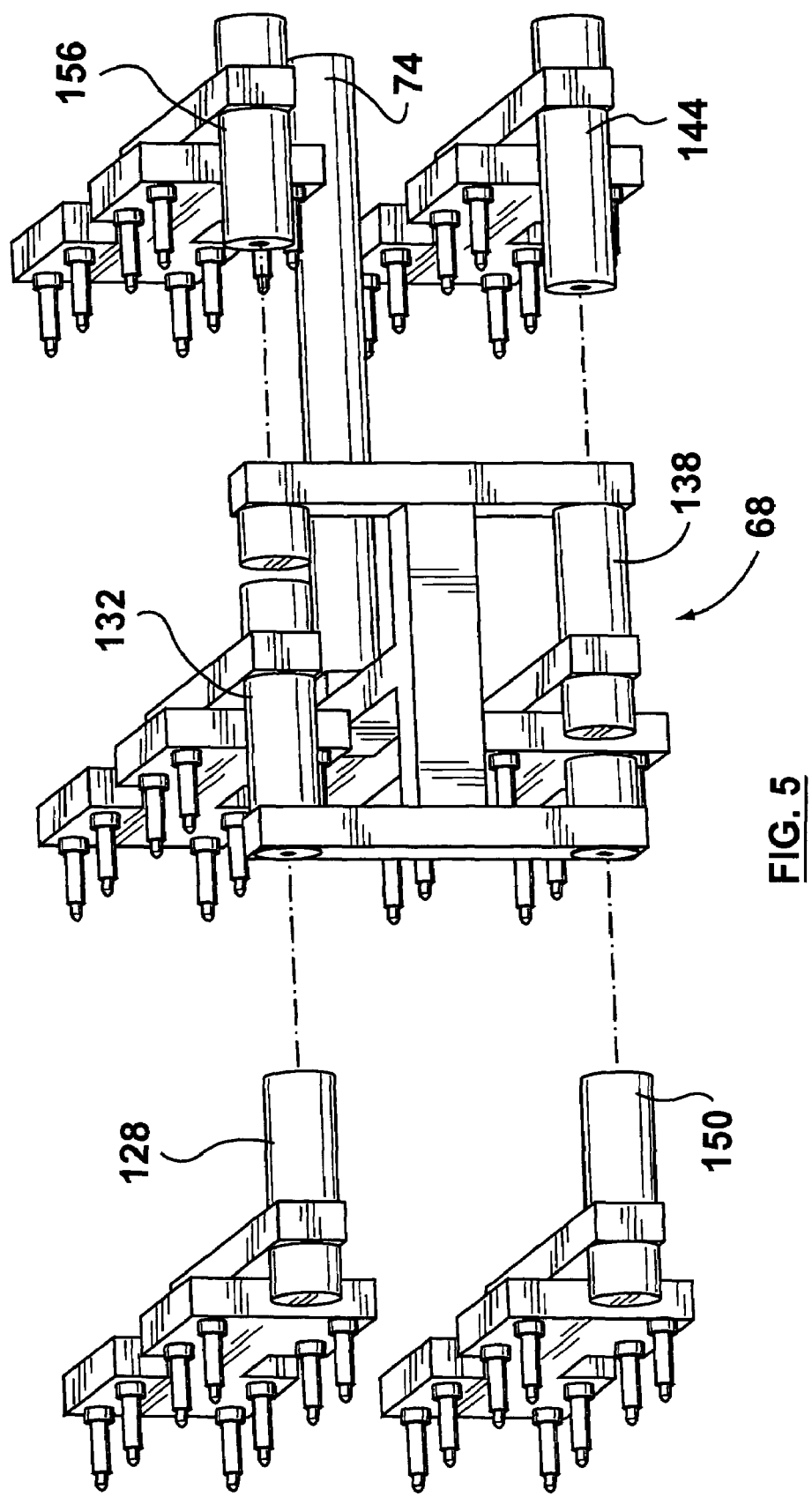
FIG. 5 is a perspective view of the components shown in FIG. 4 but in an open or unclamped position according to an alternative embodiment of the present invention.

FIG. 5 shows the alternative embodiment of the present invention as shown in FIG. 4 but in an open or unclamped position. The flow of molten plastic from the nozzle of the injection molding machine to the flow channel 84 of the sprue bar 74 is stopped when the three-level stack mold 10 is placed in the open or unclamped position, FIG. 5, by the clamping mechanism 22. In moving the three-level stack mold 10 from the clamped or closed position shown in FIG. 4 to the unclamped or open position shown in FIG. 5 via the clamping mechanism 22, the sprue bar 74 is moved away from the nozzle of the injection molding machine by the movement of the second-level 68 away from the injection molding machine via the clamping mechanism 22. The sprue bar 74 is operatively connected to the second hot runner system 38 of the second-level 68 and, thus, moves with the second-level 68 of the three-level stack mold 10. The movement of the sprue bar 74 away from the nozzle of the injection molding machine stops the flow of molten plastic to the sprue bar 74. Specifically, the flow of molten plastic is stopped by devices known in the art. For example, the flow channel 84 sprue bar 74 may be plugged with an anti-drool bushing/ball check combo, or core stem. In addition to the sprue bar 74 moving away from the nozzle of the injection molding machine, split sprue bars 128 and 138, 144 are separated. In addition, split sprue bars 150 and 156 are separated from the transition manifold 118. These split sprue bars 128, 144; 150, and 156 along with sprue bars 132 and 138 have valve stems or bushing/ball check combo (not shown) for plugging their internal passages to stop the flow of molten plastic when disconnection or separation takes place.

In summary, the three-level stack mold 10 is assembled in the clamping mechanism 22 of the injection molding machine such that all of the cavity plates 30 are facing in the same direction and all of the core plates 32 are facing in the same direction. The clamping mechanism 22 simultaneously moves the cavity plates 30 and the core plates 32 into engagement, or into a closed or clamped position. The nozzle of the injection molding machine distributes molten plastic to the flow channel 84 of the sprue bar 74. The molten plastic is then distributed as previously explained with respect to FIG. 4, which is a balanced distribution system. Thereafter, the cavity plates 30 and the core plates 32 are simultaneously separated, thereby allowing removal of the resulting plastic parts, which are all facing in the same direction. The present invention is a balanced system that simultaneously opens and closes the molds, simultaneously injects plastic into the cavities 34, and produces plastic parts facing in the same direction.

In still another embodiment, the three-level stack mold 10 is assembled in the clamping mechanism 22 of the injection molding machine such that all of the cavity plates 30 are facing in the same direction and all of the core plates 32 are facing in the same direction. The nozzle of the injection molding machine distributes molten plastic to the flow channel 84 of the sprue bar 74. However, the molten plastic is unevenly distributed to the manifolds 42, 44, 46 of all three-levels 66, 68, 70. Therefore, the manifolds 42, 44, 46 are configured to balance the distribution system before the molten plastic reaches the cavities 34. In one embodiment, the internal channels sizes (e.g., diameter, length) are configured to balance the flow. In still another embodiment, internal channels may be divided into a plurality of internal channels to balance the flow of the molten plastic to the cavities 34. These embodiments are configured to transform an unbalanced system to a balanced system. These embodiments can be used in a multiple-level stack mold 10 that has molds that are simultaneously opened and closed, that have cavities 34 that are simultaneously injected with molten plastic, and produce plastic parts facing in the same direction.

The individual components shown in outline or designated by blocks in the attached Drawings are all well-known in the injection molding arts, and their specific construction and operation are not critical to the operation or best mode for carrying out the invention. The present invention was described with respect to hot runner systems, so it is understood that the melt channels, bushings, manifolds, passages, nozzles, flow paths, sprue bars, split sprue bars, and other components are heated or maintained at a temperature to facilitate the flow of molten plastic.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A multiple-level stack mold having a plurality of levels, comprising:
   a plurality of cavity plates, wherein each of said plurality of cavity plates has a first side with cavities thereon, and wherein the first sides are all facing in a first direction;
   a plurality of either core plates or plates having core inserts thereon, said cores or core inserts extending from a first side of the core plates, and wherein the first sides are all facing in a second direction;
   wherein the plurality of either core plates or plates having core inserts thereon in use simultaneously engage the plurality of cavity plates; and
   a plurality of hot runner systems for receiving and distributing molten plastic in equal amounts to the plurality of cavities, thereby producing plastic parts, wherein at least two of the plurality of hot runner systems are interspaced between at least two of the plurality of core plates, the plurality of cavity plates, or the plurality of plates having core inserts thereon, each of the plurality of hot runner systems including a respective subset of nozzles, each of which faces in the same direction, so that tips of the nozzles are fluidly connectable with cavities of the cavity plates such that the cavity plates are also facing in the same direction.

2. The multiple-level stack mold according to claim 1, wherein when the plurality of either core plates or plates having inserts thereon engage the plurality of cavity plates, a plurality of cavities are defined for receiving molten plastic.

3. The multiple-level stack mold according to claim 2, further including split sprue bars in fluid communication with the plurality of hot runner systems for receiving and distributing molten plastic in equal amounts to the plurality of cavities, thereby producing plastic parts.

4. The multiple-level stack mold according to claim 3, further including a plurality of flow passages in the plurality of hot runner systems and the split sprue bars, wherein the flow passages to each of the plurality of levels have substantially equal lengths for distributing molten plastic in equal amounts to the plurality of cavities.

5. The multiple-level stack mold according to claim 4, further including a sprue bar having a flow channel in fluid connection with a second level of the plurality of levels of the multiple-level stack mold, for supplying molten plastic to the plurality of hot runner systems.

6. The multiple-level stack mold according to claim 5, wherein after the plurality of cavities receive the molten plastic, the plurality of core plates or plates having core inserts thereon simultaneously move out of engagement with the plurality of cavity plates.

7. The multiple-level stack mold according to claim 3, wherein the plastic parts produced are facing in a same direction.

8. The multiple-level stack mold according to claim 7, wherein the multiple-level stack mold is a three-level stack mold.

9. The multiple-level stack mold according to claim 8, wherein each of the three-levels of the three-level stack mold is configured with at least one of the plurality of hot runner systems, and each of the hot runner systems includes a manifold for directing the molten plastic to all three-levels in equal amounts.

10. A multiple-level stack mold having a plurality of levels, comprising:
    a plurality of cavity plates, wherein each of said plurality of cavity plates has a first side configured to receive cavities thereon, and wherein the first sides are all facing in a first direction;
    a plurality of either core plates or plates configured to receive core inserts thereon, said cores or core inserts extending from a first side of the core plates, and wherein the first sides are all facing in a second direction;
    wherein the plurality of either core plates or plates are configured to simultaneously engage in use the plurality of cavity plates; and are further configured to accommodate, in use:
    a plurality of hot runner systems for receiving and distributing molten plastic in equal amounts to the plurality of cavities, thereby producing plastic parts, wherein at least two of the plurality of hot runner systems are interspaced between at least two of the plurality of core plates, the plurality of cavity plates, or the plurality of plates having core inserts thereon, each of the plurality of hot runner systems including a respective subset of nozzles, each of which faces in the same direction, so that tips of the nozzles are fluidly connectable with cavities of the cavity plates such that the cavity plates are also facing in the same direction.

11. A hot runner system capable of being accommodated in use by a multiple-level stack mold having a plurality of levels, the multiple-level stack mold including a plurality of cavity plates, wherein each of said plurality of cavity plates has a first side configured to receive cavities thereon, and wherein the first sides are all facing in a first direction; a plurality of either core plates or plates configured to receive core inserts thereon, said cores or core inserts extending from a first side of the core plates, and wherein the first sides are all facing in a second direction; wherein the plurality of either core plates or plates are configured to simultaneously engage in use the plurality of cavity plates; the hot runner system comprising:

a plurality of hot runner systems for receiving and distributing molten plastic in equal amounts to the plurality of cavities, thereby producing plastic parts, wherein at least two of the plurality of hot runner system are interspaced between at least two of the plurality of core plates, the plurality of cavity plates, or the plurality of plates having core inserts thereon, each of the plurality of hot runner systems including a respective subset of nozzles, each of which faces in the same direction, so that tips of the nozzles are fluidly connectable with cavities of the cavity plates such that the cavity plates are also facing in the same direction.

* * * * *